(12) United States Patent
Parekh et al.

(10) Patent No.: US 7,120,144 B1
(45) Date of Patent: Oct. 10, 2006

(54) UNIVERSAL APPLICATION DECODE ENGINE

(75) Inventors: Pankaj Parekh, San Jose, CA (US); Sandeep Gupta, Delhi (IN); Vijay Mamtani, Delhi (IN); Himanshu Deoskar, Fremont, CA (US)

(73) Assignee: iPolicy Networks, Inc., Fremont, CA (US)

( * ) Notice: Subject to any disclaimer, the term of this patent is extended or adjusted under 35 U.S.C. 154(b) by 223 days.

(21) Appl. No.: 09/956,394

(22) Filed: Sep. 18, 2001

Related U.S. Application Data

(60) Provisional application No. 60/233,858, filed on Sep. 20, 2000.

(51) Int. Cl.
*H04L 12/28* (2006.01)
*H04L 12/56* (2006.01)

(52) U.S. Cl. ............ 370/389; 370/236; 370/473; 709/223; 709/227

(58) Field of Classification Search .......... 370/389, 370/473, 465, 236, 235, 230, 259, 261, 351, 370/352, 360, 392, 395.2, 395.3, 395.54, 370/426; 709/223, 224, 225, 226, 227, 228, 709/200; 707/3, 104.1
See application file for complete search history.

(56) References Cited

U.S. PATENT DOCUMENTS

| | | | | |
|---|---|---|---|---|
| 5,446,795 A | * | 8/1995 | Devries et al. ............ | 380/208 |
| 6,133,853 A | * | 10/2000 | Obradovich et al. ........ | 340/905 |
| 6,148,261 A | * | 11/2000 | Obradovich et al. ........ | 701/208 |
| 6,172,988 B1 | * | 1/2001 | Tiernan et al. ............. | 370/473 |
| 6,182,146 B1 | * | 1/2001 | Graham-Cumming, Jr. . | 709/238 |
| 6,199,044 B1 | * | 3/2001 | Ackley et al. ............. | 704/275 |
| 6,466,984 B1 | * | 10/2002 | Naveh et al. ............... | 709/228 |
| 6,671,724 B1 | * | 12/2003 | Pandya et al. ............. | 709/226 |
| 6,678,835 B1 | * | 1/2004 | Shah et al. ................... | 714/4 |
| 6,697,857 B1 | * | 2/2004 | Dixon et al. ................ | 709/224 |
| 6,708,187 B1 | * | 3/2004 | Shanumgam et al. ....... | 707/201 |
| 6,816,903 B1 | * | 11/2004 | Rakoshitz et al. .......... | 709/226 |
| 6,826,609 B1 | * | 11/2004 | Smith et al. ................ | 709/225 |

\* cited by examiner

*Primary Examiner*—Ajit Patel
*Assistant Examiner*—Chirag Shah
(74) *Attorney, Agent, or Firm*—Thelen Reid & Priest LLP

(57) ABSTRACT

A universal application decode engine that can be programmed to decode packet streams and identify the application which is generating the packet streams is disclosed. The universal application decode engine comprises a packet receiver, a state machine execution engine for executing application decode instructions, and a session correlation lookup engine for correlating a new session to an existing session.

2 Claims, 9 Drawing Sheets

Application Deocde Engine

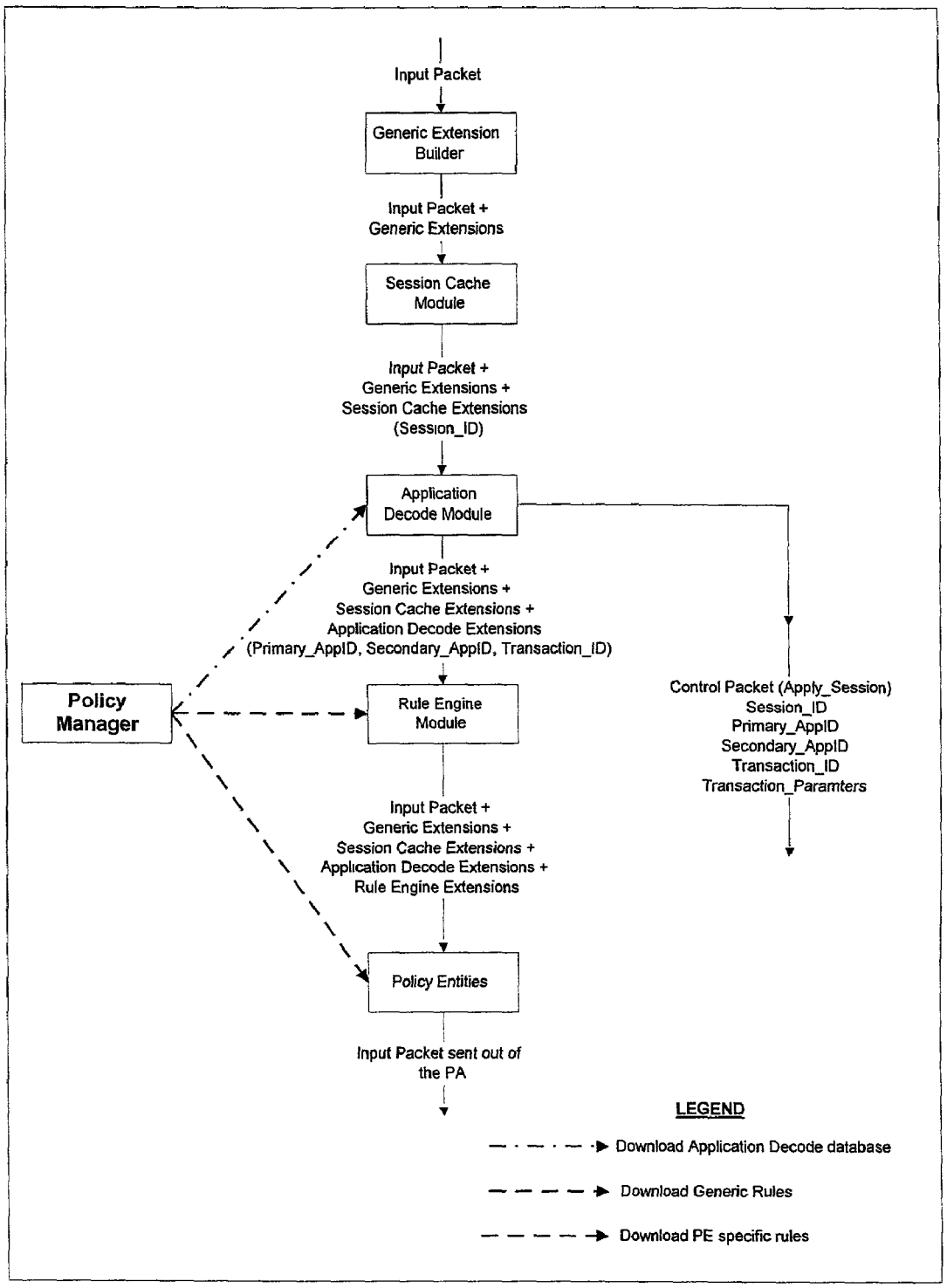
Fig 1. PA Functional Flow Chart

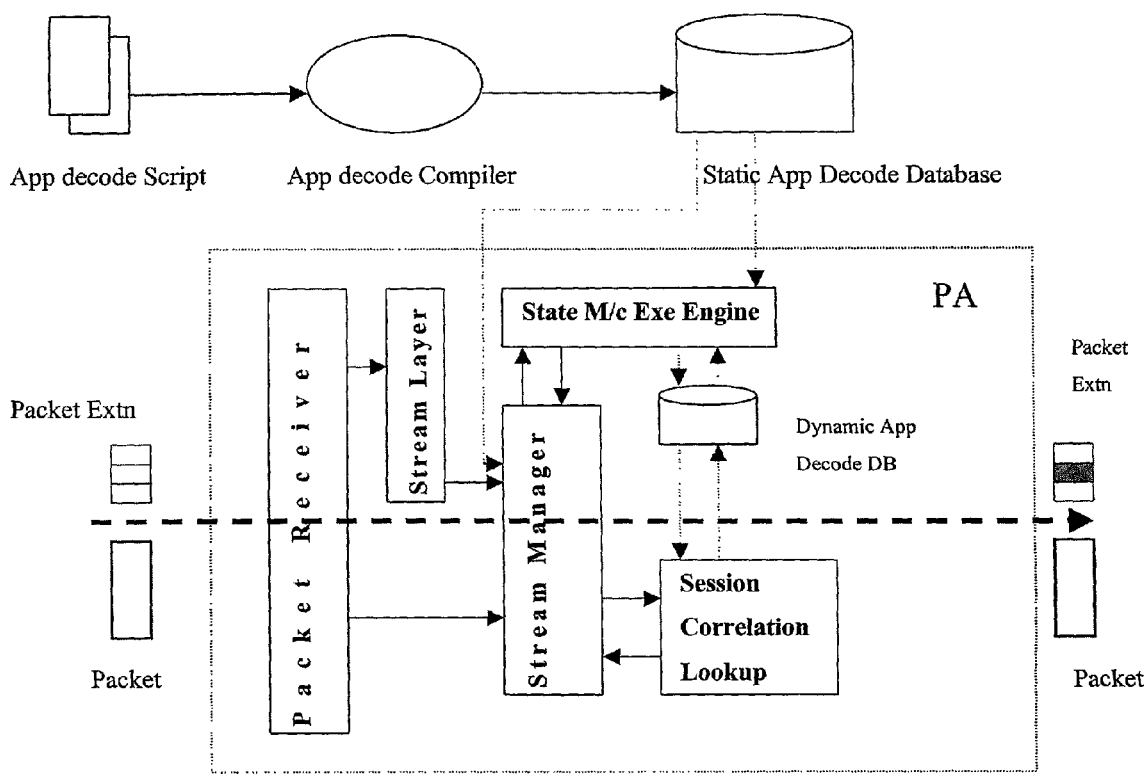
Figure 2 Application Deocde Engine

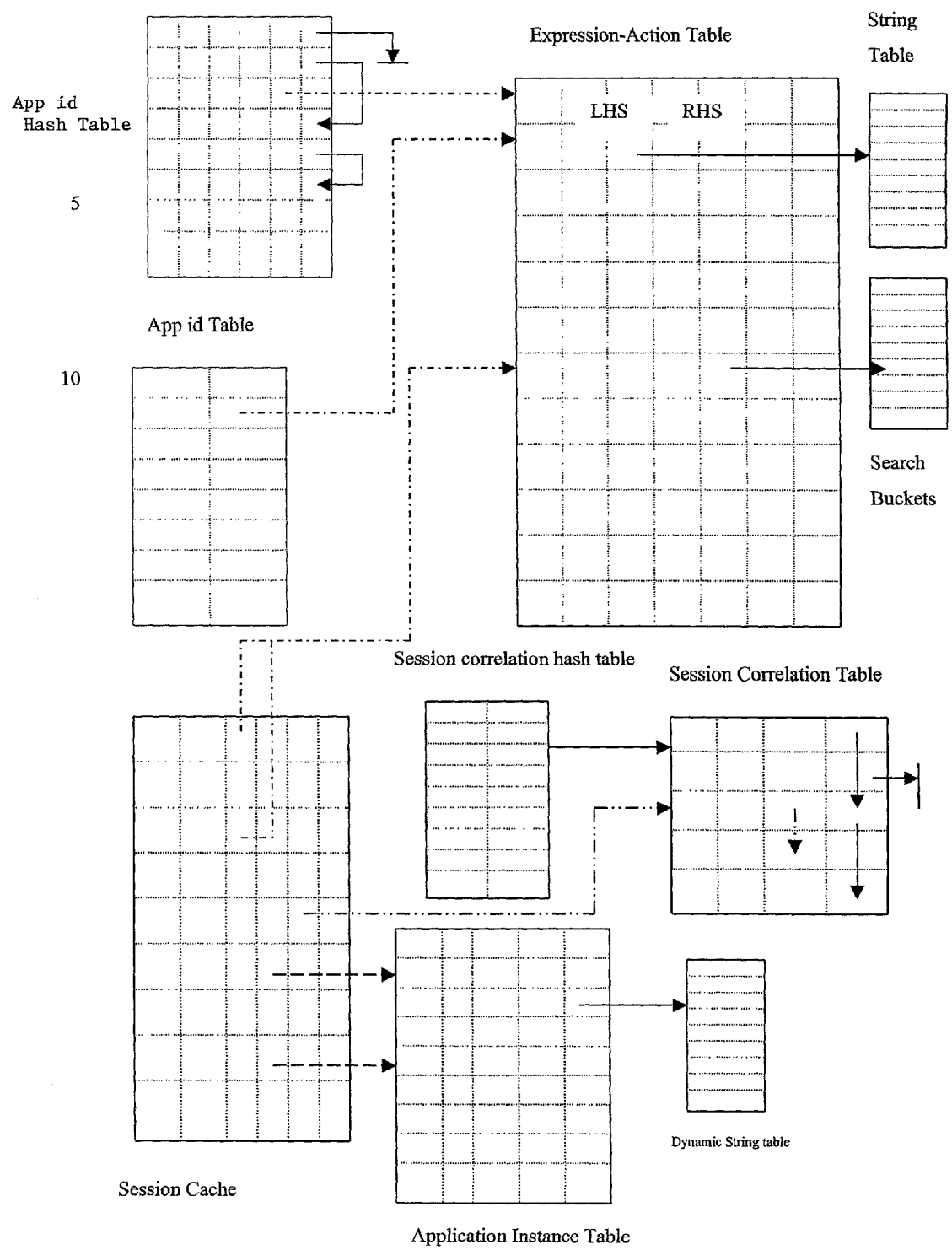
Figure 3 Application decode Database

| Opcode | Lhs_type | Lhs_value | Rhs_type | Rhs_value | Next_Offset | Result Register |
|---|---|---|---|---|---|---|
| MOV32 | Offset_of_pkt_extn_tyoe | Offset of primary app id in the pkt extn | Offset_of_app_id_table_type | Offset_of_app_id_in app id_table | | |
| BGT16 | Offset_of_app_instance_table_type | Offset_of_payload_len_in application instance entry | Imm_val | 20 | ↓ | |
| Apply_to_SSN | Bit_Mask | Bit_mask_value | | | | |
| RET | State_id | Next_state_value | | | | |
| RET | State_id | Next_state_value | | | | |
| STRCYP | Offset_in_AI | Offset_of_parameter_in_AI | Const_string_index | Const_string_index_value | | |
| | | | | | | |
| | | | | | | |
| | | | | | | |

Figure 4 Expression Action Table

| Opcode Type | Opcode | Description |
|---|---|---|
| Arithmetic | ADD8, ADD16, SUB8, SUB32 | Adds/subtracts the 8-bit/16 bit/32 bit values identified by 'lh_type'-'lhs_offset' and 'rhs_type'-'rhs_offset' and stores the result in the register identified by 'ResultRegister'. |
| Logical | AND8, OR32 | The 8-bit/16 bit/32 bit value identified by 'lhs_type'-'lhs_offset' will be logically Anded/ORed with the 8-bit/16 bit/32 bit value identified by 'rhs_type'-'rhs_offset' and the result is to be stored in the register identified by 'ResultRegister'. |
| Control | JAND8, JOR32, BEQ16 | Branch to index identified by 'NextIndex', if logical ANDing/Oring/Equal_to_operation of 8 bit/16 bit/32 bit value identified by 'lhs_type'-'lhs_offset' and value identified by 'rhs_type'-'rhs_offset' is TRUE. Else execute next row. |
| System | RET | Returns normally if 'lhs_type' is NULL<br><br>Returns the StateEventTreeIndex, identified in 'lhs_value', if 'lhs_type' is STATE_ID. |
| System | FUNCCALL | Calls a function based on the index identified in 'lhs_value'.<br><br>*Note*: The App Decode engine on seeing this opcode, will fill the return address on to the stack, as a last parameter. |
| System | MOV8 | Move the 8 bit value identified by 'rhs_type'-'rhs_offset' to the variable identified by 'lhs_type'-'lhs_offset'. |

Figure 5 State Machine Execution Engine Instructions

```
ExecuteStateMachine (StateEventPtr)
{
    Bring 8 rows of Expression Action Table with source
    as StateEventPtr into local Cache while (TRUE)
    {
        Result = 0; /* EXECUTE NEXT ROW */

GET OPCODE in 'opcode' register as current expression-action
table entry's (curr_expr_action_table_entry) opcode;

/* load lhs operand in registers lhstype and lhsvalue lhstype  = Curr_expr_action_table_entry->LhsType;
        lhsvalue = Curr_expr_action_table_entry->LhsValue;

switch (lhstype)
        {
            case OFFSET_IN_PKT_EXTN:
            {
                Operand1Ptr = <base address of Pkt_extn> + lhs_value;
            }
            :
            :
            case OFFSET_IN_AI:
            {
              operand1ptr = <base address of AI table> + lhs_value;
              switch (operand1ptr->parameter_type)
              {
              case STR_PARAM:
              {
                    if (currently stored parameter type in AI
                        also STR)
                    {
                        /*
                         * Earlier stored parameter was of type
                           STR
                         */
                        if (param_value does not have a valid ptr)
                        {
```

Fig. 6 1 of 4

```
            operand1ptr = Allocate space in dynamic
                        string table for parameter
        }
        Else
          /* Reuse the allocated string */
            operand1ptr = parameter value;
        }
        else
        {
          /*
           * Earlier stored parameter was of type
           * INT.
           */
        operand1ptr = Allocate space in dynamic
                    string table;
        }
} /* end of case string param */
case INT_PARAM:
{
        if (earlier stored parameter in AI table was
        also integer)
        {
        operand1ptr = pointer to AI parameter value;
        }
        else
        {
         /*
          * Earlier stored parameter was of type STR
          */
         Deallocate space used for storing the string
         Operand1Ptr =  address of AI.param
                    <param_no>;
        }
    } /* end of case of INT PARAM TYPE */
```

Fig 6 (2 of 4)

```
            } /* end of case of offset_in_AI */
            :
            :
            :
            :
        case PARAM_MASK:
        {
            Operand1Ptr = <base address of Pkt> + lhsvalue;
        }
            :
            :
            :
            :
            :
      case OFFSET_IN_PKT:
      {
            Operand1Ptr = CurrPtr + <Offset of 'lhs_value'>;
      }
    }

Load the right hand side operand only if required (based on the
opcode of the expression_action table;
        /*
        *   PERFORM OPERATION
        */
        switch on(OpCode)
        {
            case ADD8 :
            {
                Operand1 = *Operand1Ptr[8:0];
                Operand2 = *Operand2Ptr[8:0];
                Load CurrPtr->ResultReg;
                *CurrPtr->ResultReg = Operand1 + Operand2;
                Result=0;
                break;
            }
            :
            :
            :
            case RET :
            {
                if (Operand1==STATE_ID)
                {
                    SC.StartEventTreePtr = Operand1;
                    Write back SC entry back to main memory
                    return /* Stop Executing the State Machine. */
                }
                else
                {
                    /*
                     *  No need to fill SC.StartEventTreePtr as the
                     *  StartEventTreePtr will be same for all
                     *  subsequent packets.
                     */
                }
            }
        }

/*
         * Result will be set on performing the operation.
```

Fig 6 (3 of 4)

```
        */
     if (Result)
     {
        if ( next expression table entry not in local cache)
           GET NEXT BLOCK OF ROWS FROM main memory into local cache.

else
        {
           /*
            *  THE NEXT ROW EXISTS IN THE LOCAL cache ONLY.
            *  NO NEED TO GET IT FROM main memory.
            */
           Curr entry in expr_action_table = next offset +
                             curr_entry_in_expr_action_table;
        }
     }
     else
     {
        /*
         * Except for Control operations all will have
         * ResultReg set as 0, hence control will
         * reach here.
         */
        increment curr_entry_in_expr_action_table;
        if (cur entry not in local cache)
              get next 8 rows in the local cache
     }
  }
}
```

UNIVERSAL APPLICATION DECODE ENGINE

CROSS-REFERENCE TO RELATED APPLICATION

This application claims priority under 35 U.S.C. §119(e) to U.S. Provisional patent application Ser. No. 60/233,858, now abandoned entitled "Universal Application Decode Engine," filed Sep. 20, 2000, the subject matter of which is incorporated by reference in its entirety herein.

BACKGROUND OF THE INVENTION

1. Field of the Invention

The present invention relates to development of a universal application decode engine which can be programmed to decode a packet stream and identify the application which is generating that packet stream and extract further information such as current transaction and transaction parameters of the application from the packet stream. This extracted application knowledge could be used for a variety of purposes including enforcement of specific policies based on application and transactions. Specifically, the application decode engine is able to decode the IP packets flowing through it up to application layer (of OSI 7 layer model), identify the transaction(s) of the application and any associated parameters of the transaction in real time (at high speeds of the order of Gigabits/sec).

2. Description of Related Art

The explosive growth of Internet has resulted into a host of new application traffic flowing in the Internet. The traffic characteristics of various applications in terms of quality of service (QoS) requirements is different for different applications. While some applications are delay sensitive, others may be more loss sensitive. Some applications may require some minimum guaranteed bandwidth to work properly while others may generate small burst of high priority traffic. From the user perspective, the response time for an application may be more important in case of certain type of transactions as compared to other transactions of the same application. Thus the ability to identify the application and transactions underway associated with each packet stream is very essential for the emerging set of Internet devices for them to be able to differentiate between all the packet streams flowing through them and provide different QoS and traffic treatment to individual packet stream.

In the past, a number of protocol decode algorithms/implementations have been done as part of network analysis devices. Most of these have not taken a generic approach and require development of specific piece of code to decode newer applications. Some of the implementations have taken a generic approach but are limited to decoding each individual packet independently in a packet stream and are not able to extract/associate application knowledge from multiple packets seen as a stream.

SUMMARY OF THE INVENTION

The features and advantages described in this summary and the following detailed description are not all-inclusive, and particularly, many additional features and advantages will be apparent to one of ordinary skill in the art in view of the drawings and specifications.

According to the invention, a Universal Application Decode Engine is one of the sub modules of Policy Agent (PA). A PA comprises of various sub-modules such as Extension builder, Session Manager, Application Decode engine, Rule Processing engine and multiple Policies enforcement engines. All packets passing through the PA are analyzed by various sub modules and the intelligence gathered by respective sub module is passed to other sub-modules through use of a packet extension that is attached with every packet passing through the PA (and is stripped off before the packet exits the PA). All sub modules of PA operate at real time processing rates in order to be able to operate in a real network environment. The PA is further supported by a Policy Manager that is responsible for configuring the policies/rules to be enforced by the PA and hence its policy engines.

According to the invention, the Policy Manager downloads the application decode database to the PA and Application Decode Engine is responsible for decoding the packet streams and identifying which stream belongs to which application and what transactions are underway in various packet streams. The common processing of IP packets required for Universal Application Decode Engine is performed by Extension builder module and the session manager modules. The Session manager provides a unique identifier for all packets of a packet stream which is used by the application decode engine to correlate different incoming packets into multiple streams on which it is parallely working.

According to the invention, the Universal Application Decode engine performs the application decode for each packet stream and identifies a primary application and for tunneled applications, a secondary application that is resulting into that packet stream. The engine is further able to co-relate multiple packets of a stream and identify the current transaction of the application underway and other parameters of the current transactions which may be useful for any policy enforcement. The application decode engine is, further, able to pass this knowledge either as part of the packet extension or specific control packets generated for this purpose. The engine uses an application decode database and its design and implementation is independent of the applications it is decoding. The application knowledge is captured as part of application decode database making the decode engine very extensible.

This invention defines the structure of the application decode database and algorithm of the application decode engine.

The Universal Application Decode Engine according to the invention provides application layer decodes of IP packets based on application knowledge at high speeds. Though, the concept has been applied to IP packets, it can be extended with minimal modifications to other networking technologies and protocols.

The invention will be understood by reference to the following detailed description in connection with the accompanying drawings. The figures depict embodiments of the present invention for purpose of illustration only. One skilled in the art will readily recognize from the following discussion that alternative embodiments of the illustrated structures and methods may be employed without departing from the principles of the invention described herein.

BRIEF DESCRIPTION OF THE DRAWINGS

FIG. 1 is a flow chart illustrating the functions of the Policy Agent;

FIG. 2 is a block diagram illustrating the functions of the Application Decode Engine;

FIG. 3 is a diagram illustrating the structure of the Application Decode Database;

FIG. 4 illustrates examples of entries in the Expression-Action Table;

FIG. 5 illustrates examples of Opcodes supported by the State Machine Execution Engine; and FIG. 6 is the pseudo code of State Machine Execution Engine.

DETAILED DESCRIPTION OF THE PREFERRED EMBODIMENTS

FIG. 1 illustrates the functional flow of a typical packet in the PA. This flow is for the data/control packets that are of "interest" to the PA and on which the Application decode engine works to decode the application, transaction and transaction parameters. The figure depicts the changes in the packet extension as the packet (with its extension) passes through various functional modules of the PA. The Universal Application Decode Engine processes packets after the Session Cache module and hence has the unique session id associated with each packet stream as its input along with other fields in the packet extension. The application decode engine modifies the packet extension to include the primary application id, secondary application id and the transaction id. The application decode engine may generate additional control packets (based on the application decode database) carrying the primary application id, secondary application id, transaction id and transaction parameters and the session id identifying the session on which that transaction of the application is happening. The control packets and/or the application decode extension fields in packet extension may be used by other modules of PA to decide what policies need to be enforced for the session.

FIG. 2 depicts the functional block diagram of the application decode engine. The packet receiver sub-module receives the incoming packet, identifies the session it belongs to based on session id in the packet extension, brings the application decode state machine information for the session in local cache from main memory. It then checks whether any further application decode state machine execution needs to be done or the state machine is in a state where the decode is complete and the packet extension can be modified with the application decode information based on the last packet processed decode. In case, the application decode has to be done for the session, it passes the packet to 'Stream Layer' in case the packet belongs to a TCP stream otherwise it passes the packet to 'Stream Manager'. The 'Stream Layer' module is specific to TCP and takes care of out of order arrival of packets and retransmitted packets and provides an interface to the 'Stream manager' which ensures it sees each byte in a steam only once and in proper sequence. The 'Stream Manager' takes care of creating and maintaining the session cache entry, the application instance table entry for each packet stream and cleanup required at the end of session. It also modifies the application decode extension part of the packet extension with the information maintained in the session cache by the 'State Machine execution engine'. The 'State machine execution engine' actually executes the instructions (from the expression-action table—refer to FIG. 3) based on the current state of the session and may take the session to next state of application decode, may modify the 'application instance table entry' to store information to be used for decode of subsequent packets in the stream and maintains the application decode information in the session cache. As part of the execution of the state machine instructions, the 'State Machine Execution Engine' may populate the Session Correlation data in dynamic application decode database for the sessions that are related to each other. The 'Session Correlation lookup engine', then uses this database to correlate a new session to an existing session so that appropriate decode may be applied for the packet stream of the new session. This functionality of the application decode engine is important to take care of the applications that do not run on fixed port (TCP/UDP port) but may allocate dynamic port and use them.

FIG. 2 also depicts that the application decode scripts define how the application is to be decoded and they are translated into the static application decode database by the application decode compiler which is then downloaded to the PA to be used by the application decode engine.

FIG. 3 illustrates the various tables being maintained by the application decode engine. The application id Hash table is used to identify the application for those applications which run on a fixed range/set of ports and also the start of state event expression-action table entry for the application decode at the start of the session. The Expression-action table has the instructions to be executed for the application decode for each event possible in each state of the application. To optimize on the memory and the execution speed, the constant strings defined in the application decode database are kept in a separate 'constant string table' and the 'search buckets' are used to find what event has occurred on arrival of the current packet in the current application state.

FIG. 3 also depicts the dynamic application decode database which consists of session cache table, session correlation table and its hash table, application instance table and the dynamic string table. The session cache has an entry for each packet stream and stores the current state of the application decode, next expression-action table entry to be executed for next packet in arriving in the packet stream, maintains a link in the session correlation table for all the sessions which are related to the session and pointer to the application instance in the application instance table. The application instance table is used to store the information that may be required to decode the subsequent packets of the stream or may be used to share the information between a primary session and secondary sessions which are correlated. The session correlation table keeps track of the sessions that are correlated and is useful to identify the application id whose decode needs to be executed for a correlated session of a primary session. The application instance table stores the strings in a separate dynamic string table to optimize on the memory.

FIG. 4 illustrates a sample set of expression-action table entries. The first column in the table has the opcode that defines how to execute the instruction. Each expression is viewed as a set of atomic expressions where an atomic expression always has a two operands (left hand side and right hand side) and an operator (which defines the opcode). Thus an entry in the expression-action table either defines an atomic expression to be evaluated or defines an action. An action could be as simple as moving content of a variable into another variable or it could be at higher level (as an example call to a function). The first entry in the expression-action table in FIG. 4, for example, is an action entry that copies 32 bit value of application id in application id table entry for the current session into the primary application id field of the packet extension of the packet being processed. The second entry, similarly, defines that the next entry to be executed is entry number 5 if the payload length (stored in application instance entry) exceeds a value of 20 otherwise continue with the next entry execution.

FIG. 5 is a table describing the various types of instructions supported by the state machine execution engine and has some sample instructions and a brief description of functionality of each instruction. This table is not a complete listing of the instructions supported by the state machine execution engine but only a sample of instruction set.

FIG. 6 is the pseudo code of the algorithm which is executed by the State Machine Execution engine to execute each instruction/entry of the expression-action table:

REFERENCES

The following specifications are incorporated by reference in their entirety for all purposes:
RFC 793, Internet Protocol Specifications
Transport Control Protocol Specifications
Universal Datagram Protocol Specifications Miscellaneous In the foregoing specification, the invention has been described with reference to specific exemplary embodiments thereof. Other embodiments will be apparent to those of ordinary skill in the art. Further, while the present invention has been described using a particular combination of hardware and software, it should be recognized that other combinations of hardware and software are also within the scope of the present invention. The present invention may be implemented in hardware or in software or using combinations thereof.

As will be understood by those familiar with the art, the invention may be embodied in other specific forms without departing from the spirit or essential characteristics thereof. Likewise, the particular naming of the modules, features, attributes or any other aspect is not mandatory or significant, and the mechanisms that implement the invention or its features may have different names or formats. Accordingly, the disclosure of the present invention is intended to be illustrative, but not limiting, of the scope of the invention.

Thus, it is evident that various modifications and changes may be made thereunto without departing from the broader spirit and scope of the invention.

What is claimed is:

1. A universal application decode engine for use in a policy agent for decoding packet streams and identifying applications generating the packet streams, the universal application decode engine comprising:

a packet receiver for receiving an incoming packet and for identifying a session to which the packet belongs based on a session identifier attached to the packet;

a state machine execution engine for executing application decode instructions upon the received packet in accordance with a state of the session so as to output application decode information, the application decode instructions being stored in and retrieved from a static application decode database; and a session correlation lookup engine coupled to the state machine execution engine for correlating a new session to an existing session by use of session correlation data of a dynamic application decode database during the execution of application decode instructions by the state machine execution engine.

2. The universal application decode engine of claim 1, further comprising:

a stream manager coupled to the packet receiver and the state machine execution engine for providing to the state machine execution engine the packet received by the packet receiver and storing the application decode information output from the state machine execution engine, the stream manager maintaining a session cache which stores the application decode information output from the state machine execution engine.

* * * * *